United States Patent

Dai

(10) Patent No.: US 9,497,520 B2
(45) Date of Patent: Nov. 15, 2016

(54) SYSTEMS AND METHODS OF WAVELENGTH DIVISION MULTIPLEX PASSIVE OPTICAL NETWORKING

(71) Applicant: COX COMMUNICATIONS, INC., Atlanta, GA (US)

(72) Inventor: Yuxin Dai, Santa Rosa, CA (US)

(73) Assignee: Cox Communications, Inc., Atlanta, GA (US)

(*) Notice: Subject to any disclaimer, the term of this patent is extended or adjusted under 35 U.S.C. 154(b) by 0 days.

(21) Appl. No.: 14/509,146

(22) Filed: Oct. 8, 2014

(65) Prior Publication Data

US 2016/0105736 A1 Apr. 14, 2016

(51) Int. Cl.
*H04B 10/50* (2013.01)
*H04Q 11/00* (2006.01)

(52) U.S. Cl.
CPC ........ *H04Q 11/0005* (2013.01); *H04B 10/503* (2013.01); *H04Q 11/0062* (2013.01); *H04Q 2011/0035* (2013.01)

(58) Field of Classification Search
CPC ......... H04Q 11/0005; H04Q 11/0062; H04Q 2011/0035; H04B 10/503
USPC ................... 398/49, 66–68, 70–72
See application file for complete search history.

(56) References Cited

U.S. PATENT DOCUMENTS

| | | | | |
|---|---|---|---|---|
| 5,790,287 A * | 8/1998 | Darcie | ............. | H04B 10/07 379/257 |
| 2009/0019512 A1 * | 1/2009 | Stone | ............. | H04N 21/6332 725/132 |
| 2010/0046949 A1 * | 2/2010 | Bainbridge | ............. | H04B 10/506 398/79 |
| 2010/0111533 A1 * | 5/2010 | Beckett | ............. | H04J 14/0282 398/68 |
| 2011/0076022 A1 * | 3/2011 | Tamai | ............. | H04B 10/272 398/66 |
| 2012/0315044 A1 * | 12/2012 | McGreer | ............. | H04J 14/0282 398/66 |
| 2013/0195463 A1 * | 8/2013 | Byun | ............. | H04B 10/572 398/91 |
| 2013/0315595 A1 * | 11/2013 | Barr | ............. | H04J 14/08 398/67 |
| 2015/0023664 A1 * | 1/2015 | Mukai | ............. | H04J 14/0242 398/58 |
| 2015/0030324 A1 * | 1/2015 | Chang | ............. | H04J 14/08 398/35 |

* cited by examiner

*Primary Examiner* — Dalzid Singh
(74) *Attorney, Agent, or Firm* — Benjamin A. Balser; Next ip Law Group (57) ABSTRACT

Example embodiments of a time division duplex (TDD) Wavelength Division Multiplex Passive Optical Network (WDM PON) architecture using passive optical splitters are disclosed herein. The disclosed TDD WDM PON includes fixed wavelength optical transmitters in an Optical Line Termination system with tunable receiver colorless Optical Network Units (ONUs) that reuse the downstream CW light to carry upstream data. The same wavelength may be used for downstream and upstream transmissions on a single fiber in the ODN. In this architecture, the number of ONUs may be greater than the number of transmitters at the OLT, allowing for a highly scalable system with capacity for growth. An example embodiment of the disclosed system uses Arrayed Waveguide Grating (AWG) or WDM filters at the OLT and a passive optical splitter in the field.

16 Claims, 7 Drawing Sheets

SYSTEMS AND METHODS OF WAVELENGTH DIVISION MULTIPLEX PASSIVE OPTICAL NETWORKING

TECHNICAL FIELD

The present disclosure is generally related to telecommunications and, more particularly, is related to optical network systems.

BACKGROUND

Current systems of time division multiplexing passive optical network (TDM PON), such as non-limiting examples of GPON, XGPON1, EPON, and 10G EPON, can be categorized as sharing wavelength architectures. In TDM, each transmitter transmits during a slice of the transmission period. An optical network unit (ONU) is a device that transforms incoming optical signals into electronics at a customer's premises in order to provide telecommunications services over an optical fiber network. In TDM PON, multiple ONUs share the wavelength, or the bandwidth of a particular wavelength in TDM fashion.

In order to provide higher bandwidth per ONU, next generation PONs explore the bandwidth of a fiber, i.e. utilize the full spectrum of a fiber rather than an individual wavelength. One method to increase the bandwidth per ONU is to assign a dedicated wavelength to each ONU. Many wavelength division multiplexing (WDM) PON architectures are based on wavelength routers. Either thin film filter or arrayed waveguide grating (AWG) technologies may be used in WDM PON architectures. An arrayed waveguide grating permits a single optical fiber to carry multiple channels or communication bands. Fiber optic cables use very thin glass fibers to transmit light signals containing voice or data communications.

Light passes through air or fiber cables as a series of waves, similarly to waves in water. The principle of light diffraction, where light passing through fibers of slightly different lengths exits at slightly different phases or angles, is the basis for an arrayed waveguide grating. Light exits each of the fibers in the waveguide at a slightly different point in the wave because each fiber has a different length, and the light takes more or less time to travel its length. When these out-of-phase frequencies interact, they create a diffraction pattern, which is a series of evenly spaced light signals, each with its own frequency.

In WDM, different frequencies of the light signal are used for different communication bands, and the arrayed waveguide grating is used to combine or multiplex these individual bands into a single fiber cable, allowing for many conversations or data streams to be combined. The process can be reversed at the other end of a transmission line, with the combined signals separated in a de-multiplexing waveguide.

There are few parts to an arrayed waveguide grating. The incoming fiber cable is connected to a mixing zone, with multiple fiber cables. The arrayed waveguide is lined up in a row at the other end of the zone. At the opposing end is a collection or focusing zone where the different wavelengths or channels are separated by diffraction and enter multiple fiber cables.

Figure 1:
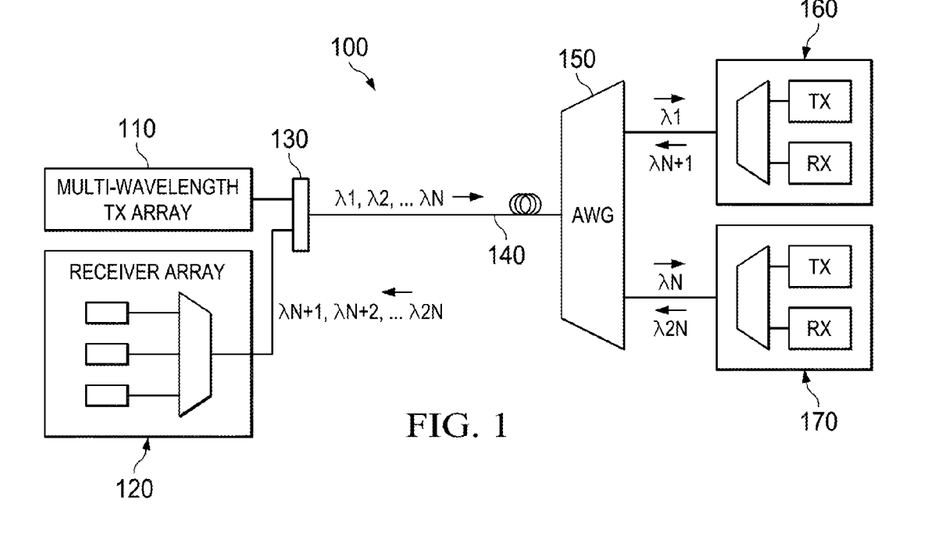
FIG. 1 is a system block diagram of an example embodiment of a WDM PON architecture using multiple wavelength transmitters array as light sources.

FIG. 1 provides system diagram 100 of a WDM PON architecture using an array of multiple wavelength transmitters as light sources in an optical line termination (OLT) system. An AWG is used in the field to route wavelengths to the ONUs using the cyclic property of an AWG to route upstream light from ONUs back to the OLT. The array of either fixed or general wavelength transmit lasers send the different wavelengths on transmission line 140 and all the wavelengths are coupled to one fiber. Multi-wavelength transmitter array 110 is coupled to fiber 140 at coupler 130, transmitting each wavelength, $\lambda_1$ to $\lambda_N$, on the fiber. The downstream transmission signals are received at AWG 150 and then split out to individual ONUs with transmit/receive pairs 160, 170 at customer premises. In this implementation, the upstream data streams are sent at a wavelength of $\lambda_{N+1}$, which is the receive wavelength+N wavelength steps. The signals are combined in AWG 150 to fiber 140 and received at the head end by receiver array 120. ONU 160 uses a cyclic property of AWG 150 to send $\lambda_{N+1}$ to the same port and the same filter on the same fiber. At the head end, there's a separate filter at the receiver. At the receiver array, there's another filter so the $\lambda_{N+1}$ gets separated to the appropriate receiver. So in this case, one ODN and one fiber handle both the upstream and the downstream transmissions.

Wavelength router based WDM PONs have many advantages. For instance, the passive AWG has much lower loss than an active power splitter and its loss is independent of the number of wavelengths. Additionally, WDM PON has the potential of supporting more ONUs than does GPON or EPON, etc. However, there are large numbers of GPON and EPON systems already deployed in the field that use passive optical power splitters. There are heretofore unaddressed needs to reuse power splitters for WDM PON with these previous solutions.

SUMMARY

Example embodiments of the present disclosure provide systems of wavelength division multiplex passive optical networking. Briefly described, in architecture, one example embodiment of the system, among others, can be implemented as follows: an optical line termination (OLT) transmitter laser of a plurality of OLT transmitter lasers configured to transmit at a particular wavelength; and a wavelength router configured to couple a downstream optical signal from the OLT transmitter laser onto a single fiber optical distribution network for reception by a passive optical power splitter, the wavelength router further configured to receive an upstream optical signal from the single fiber optical distribution network and route the upstream optical signal to an appropriate receiver.

Embodiments of the present disclosure can also be viewed as providing methods for wavelength division multiplex passive optical networking. In this regard, one embodiment of such a method, among others, can be broadly summarized by the following steps: receiving an optical signal; modulating the optical signal with an optical line termination transmitter laser at a particular wavelength; and transmitting the modulated signal to a wavelength router for transmission on a single fiber optical distribution network.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

In order to meet a seamless migration, an improved system should be backward compatible with current passive optical power splitter ODN systems. This brings several challenges to the WDM PON architecture designs. WDM PONs may use the existing GPON/EPON fiber plant with no wavelength router used in the field. Additionally, there should not be a second fiber used for upstream transmission. Issues to be overcome include assigning upstream wavelengths to each ONUs; routing upstream wavelengths back to OLTs since there is no wavelength router in the field; and solving wavelength contingency problem if upstream transmissions use the same wavelength as downstream transmissions for each ONU, among others.

Solving the upstream wavelength assignment problem economically with the architecture that enables the upstream transmission to use the same wavelength as that of downstream transmission for each ONU. In this architecture, a wavelength router (AWG or thin film filters) is used at the CO to route both downstream and upstream wavelengths; and there is no change to GPON/EPON power splitters based ODN Since the upstream and downstream transmissions of each ONU share the same wavelength, Time Division Duplex (TDD) is used for downstream and upstream traffics to avoid wavelength contingency. The downstream and upstream TDD asymmetry can be dynamically changed to fully utilize the bandwidth.

Example embodiments of a Wavelength Division Multiplex Passive Optical Network (WDM PON) architecture using passive optical splitters are disclosed herein. Disclosed WDM PON 200 as provided in FIG. 2 includes fixed wavelength optical transmitters 220 . . . 230 in Optical Line Termination (OLT) 210 system with tunable receiver colorless Optical Network Units (ONUs) 260 . . . 270 that reuse the downstream light to carry upstream data. The same wavelength may be used for downstream and upstream transmissions on single fiber 240 in ODN 215. In this architecture, the number of ONUs 260 . . . 270 may be greater than the number of transmitters 220 . . . 230 at OLT 210 allowing for a highly scalable system with capacity for growth. An example embodiment of the disclosed system uses Arrayed Waveguide Grating (AWG) 235 or thin film WDM filters at OLT 210 and passive optical splitter 255 in the field. Utilization of passive splitter based ODNs ease the migration from current Gigabit Passive Optical Network (GPON) and Ethernet Passive Optical Network (EPON) systems to WDM PON systems.

Figure 2:
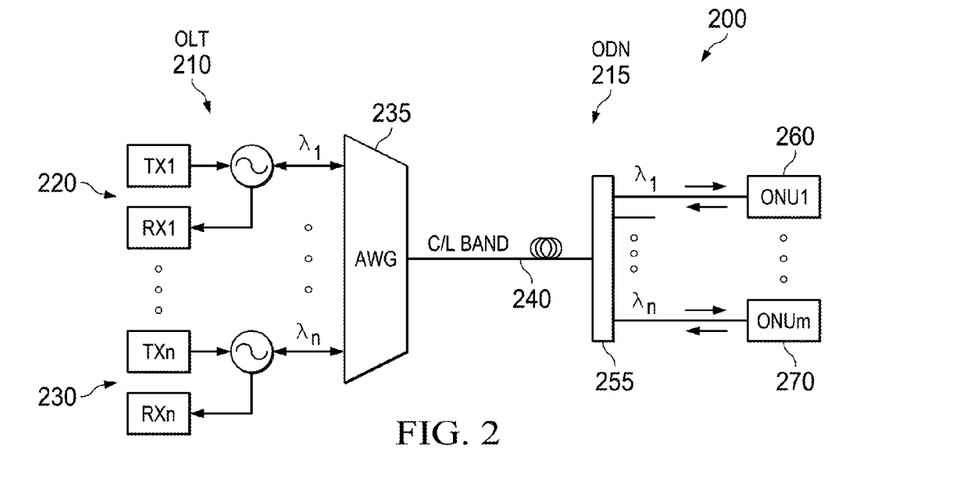
FIG. 2 is a system block diagram of an example embodiment of systems and methods of WDM PON with a wavelength router at the central office and passive optical power splitter at the optical distribution network.

Example embodiments of the systems and methods of wavelength division multiplex passive optical networking solve the upstream wavelength assignment problem economically with an architecture that enables upstream transmission using the same wavelength as that of downstream transmission for each ONU 260 . . . 270. In an example embodiment, wavelength router (AWG or thin film filters) 235 is used at the Central Office to route both downstream and upstream wavelengths. There is no change to power splitter-based ODN currently used by TDM PONs.

In an example embodiment, each of the optical signals in downstream and upstream directions is transmitted using time division duplex (TDD) on a PON. In this passive optical network, the ODN is characterized by single trunk fiber 240 connected to power coupler 255, also called a power splitter, that separates the downstream optical power into component pieces. A typical example of power coupler 255 connects to 32 ONUs. In an example embodiment, wavelength router 235 is positioned at the head end so that AWG 235 is in OLT 210. Since the transmitter is fixed, each of the transmitter and receiver pairs 220 . . . 230 corresponds to one channel. Transmitter/receiver pair 220 comprises a transmitter and a receiver for channel 1. Pair 230 comprises a transmitter and receiver pair for channel N. Each transmitter is configured to transmit on a fixed wavelength. The transmitter of pair 220 transmits on a $\lambda_1$ wavelength and is coupled to AWG 235 where it is combined with optical signals on the wavelengths of each of the other transmitters. The combined signal is transmitted along fiber 240 to passive power splitter 255. Power splitter 255 passes one piece of optical signal that contains all distinguished wavelengths to each ONU 260 . . . 270 so each ONU receives all the wavelengths transmitted on fiber 240. Each ONU 260 . . . 270 may include a filter to filter out all wavelengths but the wavelength intended for the particular ONU.

In an example embodiment, the upstream and downstream of each ONU share the same wavelength, transmitting in TDD mode to avoid wavelength contingency. The downstream and upstream transmission cycle may be dynamically changed to fully utilize the bandwidth according to the upstream and downstream traffic dynamics.

The upstream wavelengths are assigned to each ONU 260 . . . 270 by reusing the downstream light at each ONU. Previously, in downstream light reusing methods, the ONUs re-modulated the downstream light and sent it back to the OLT via a separate fiber. However, according to the systems and methods disclosed herein, the transmitter at OLT 210 sends continuous wave (CW) downstream light and modulated downstream data to an ONU. After extracting the downstream data the ONU may use the downstream CW light it receives to modulate upstream data and send data back to OLT 210 using the same fiber plant. In an example embodiment, one or both of the upstream and downstream transmitters uses on-off keying (OOK), though any appropriate modulation scheme may be used.

In an example embodiment, fixed wavelengths transmitters are used at OLT 210. There may be n fixed wavelength transmitters at the OLT that serve m ONUs, where m is greater than or equal to n. Allowing the numbers of ONUs to exceed the transmitters in OLT 210 offers scalability to the system. In such an embodiment, adding an ONU does not require changing of OLT hardware. The transmitter laser is dynamically shared by multiple ONUs.

Figure 3:
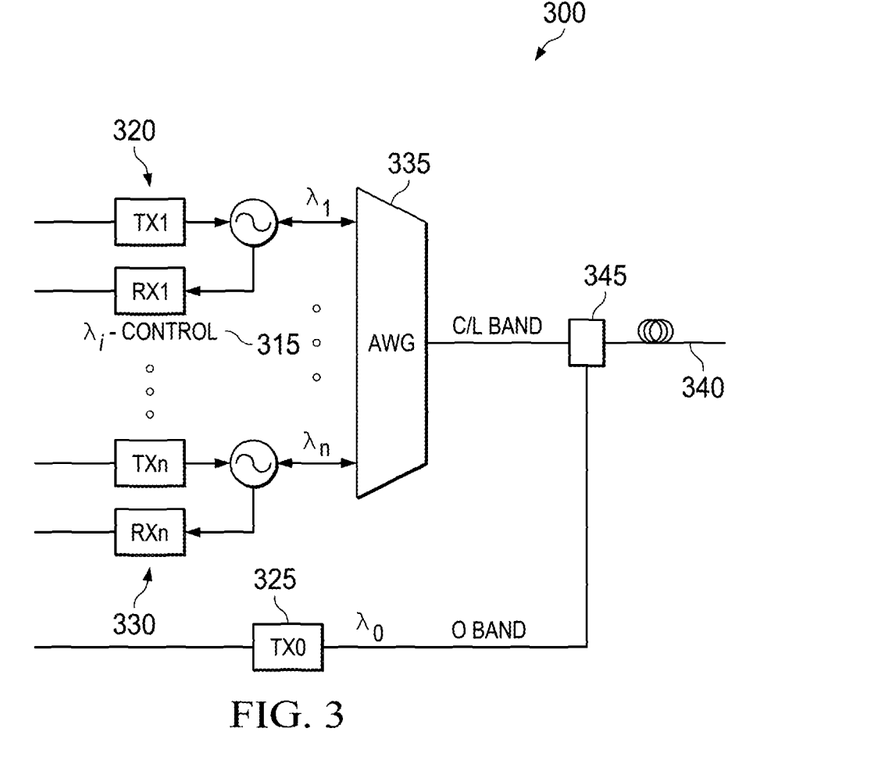
FIG. 3 is a system block diagram of an example embodiment of the OLT of the WDM PON of FIG. 2 with an out of band control channel.

FIG. 3 provides an example embodiment of WDM PON OLT design 300 with dual-band control channels as configured in the physical layers. In an example embodiment, full-time control channel 325 may be transmitted in a dedicated wavelength such as the O band (1260 nm-1360 nm), coupled to fiber 340 at coupler 345. Additionally, part-time control channel 315 may be transmitted from transmitter 320 in OLT 300 through AWG 335 and to the ONUs in the C (1530 nm-1565 nm) and/or L band (1565 nm-1625 nm). Dedicated O band control channel 325 provides reliable out-of-band control to ONUs.

Figure 4:
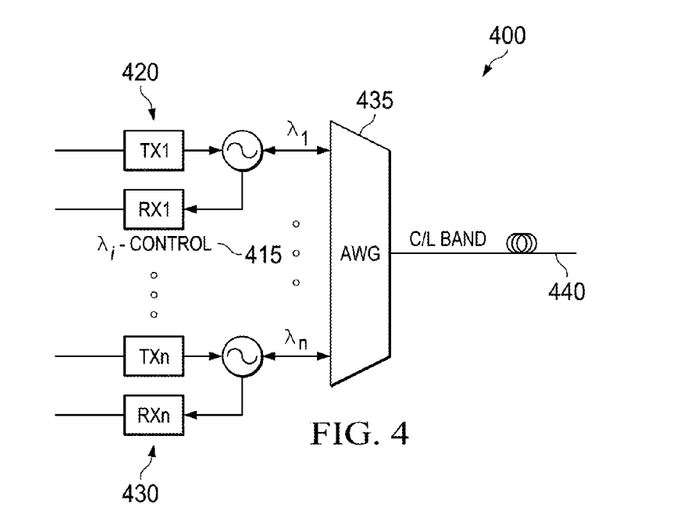
FIG. 4 is a system block diagram of an example embodiment of the OLT of the WDM PON of FIG. 2 with a single in-band C band and/or L band control channel.

FIG. 4 provides alternative embodiment 400 in which the O band control channel is removed in physical layers and full-time control channel 415 is transmitted by transmitter 420 through AWG 435 in the C band and/or L band onto fiber 440.

Figure 5:
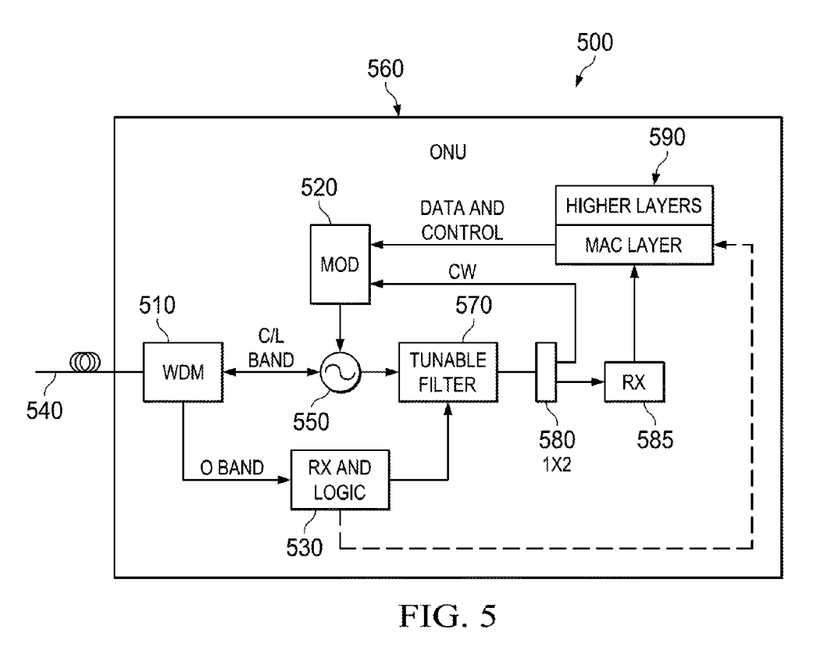
FIG. 5 is a system block diagram of an example embodiment of the ONU of the WDM PON of FIG. 2 with an out of band control channel.

FIG. 5 provides example embodiment 500 of ONU 560 with a dedicated O band control channel. In ONU 510, the O band control wavelength is separated from the C band and/or L band by WDM filter 510. O band receiver 530 constantly receives the control signal while the OLT instructs ONU 560 to tune to a wavelength in C band and/or L band for receiving downstream data. After receiving the downstream data, ONU 560 may use the CW light to transmit upstream data back to the OLT. An optical circulator 550 (between WDM 510 and tunable filter 570) may be used to separate and combine modulated downstream and upstream signals. In an example embodiment, the OLT may also send control signals periodically via a part-time control wavelength to all ONUs in case of problems with the O band control channel. In an example embodiment, ONU 560 tunes to the wavelength $\lambda_o$ of the O band control channel by default on initial boot up.

OLT also sends CW light periodically via O band control wavelength $\lambda_o$ to all ONUs. In case that an ONU does not receive downstream data but has upstream data to send, it may send the wavelength setup request by remodulating the CW light received from the O band control channel. Since most of the control command from the OLT are sent to ONUs through an O band control channel, the C band and/or L band part-time control channel may be used to carry user data as well. The downstream and upstream transmission asymmetry may be dynamically negotiated between the OLT and ONU 560. Once ONU 560 has been assigned a wavelength, in-band control may also be established as the part of the protocol.

WDM filter 510 separates the O band control channel from the rest of the C band and/or L band channels. O band receiver 530 decodes the control signal. One part of the decoded control signal is used to control tunable filter 570 for selecting the wavelength assigned to ONU 560 by the OLT. The rest of the decoded control signal is sent to MAC layer 590 to control the upstream transmission cycle. The downstream light containing multiple wavelength channels from WDM filter 510 is sent to optical circulator 550 and is passed to tunable filter 570 which selects the assigned wavelength.

The selected wavelength channel that contains CW light and modulated data signal is separated into two pieces by 1×2 splitter 580. A first piece with the modulated data signal is sent to optical receiver 585 for decoding downstream user date. The CW light is filtered out. The decoded user data is sent to MAC and higher layers 590 for further processing. The second piece with CW light is sent to modulator 520 for modulating upstream data. The original modulated downstream data is filtered out at the upstream receiver at OLT. The modulated optical signal is sent upstream via optical circulator 550.

Figure 6:
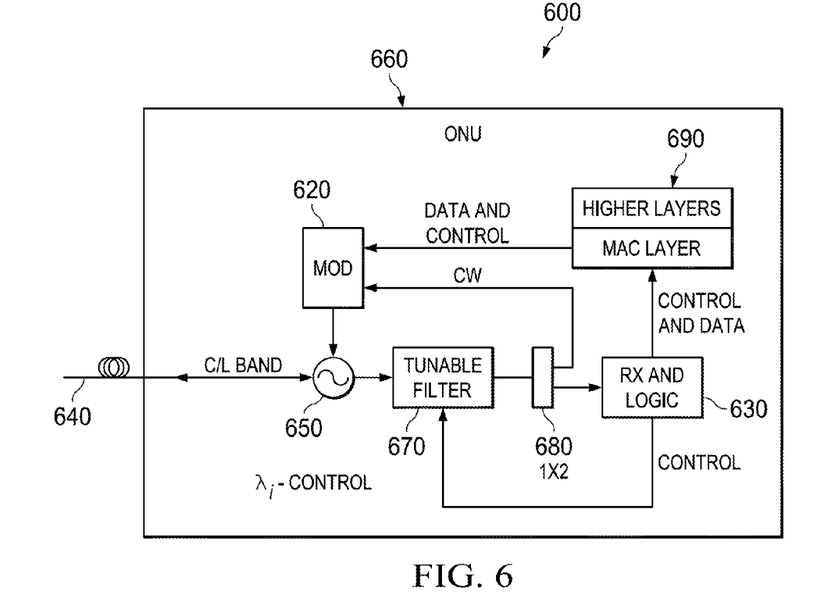
FIG. 6 is a system block diagram of an example embodiment of the ONU of the WDM PON of FIG. 2 with a single in-band C band and/or L band control channel.

In example embodiment 600 of ONU 660 of FIG. 6, a C band and/or L band wavelength $\lambda_i$ may be used as a full-time control channel. When ONU 660 initially performs a boot up sequence, ONU 660 tunes to wavelength $\lambda_i$ by default. Using this control channel, the OLT instructs ONU 660 to tune to a wavelength in C band and/or L band for receiving downstream data. After receiving the downstream data, ONU 660 can use the CW light to transmit upstream data back to OLT. Optical circulator 650 (before tunable filter 670) is used to separate and combine modulated downstream and upstream lights. Once ONU 660 has been assigned a wavelength, in-band control may also be established as the part of the protocol.

The incoming downstream light is passed by optical circulator 650 to tunable optical filter 670. The predefined control wavelength channel $\lambda_i$ is decoded. The decoded control signal is used to control tunable filter 670 for selecting the wavelength assigned to ONU 660 by the OLT. The selected wavelength channel that contains CW light and modulated data signal is separated into two pieces by 1×2 splitter 680. The first piece with the modulated data signal is sent to optical receiver 630 for decoding downstream user data. The CW light is filtered out. The decoded user data is sent to MAC and higher layers 690 for further processing. The second piece with CW light is sent to modulator 620 for modulating upstream data. The original modulated downstream data is filtered out at the upstream receiver at the OLT. The modulated optical signal is sent upstream from modulator 620 via optical circulator 650.

The OLT also sends CW light periodically via control wavelength λi to all ONUs connected to the power splitter. In a case in which ONU 660 does not receive downstream data but has upstream data to send, ONU 660 may send a wavelength setup request by re-modulating the CW light received from the C band and/or L band control channel. The TDD asymmetry of downstream and upstream transmissions may be dynamically negotiated between the OLT and ONU 660.

Figure 7:
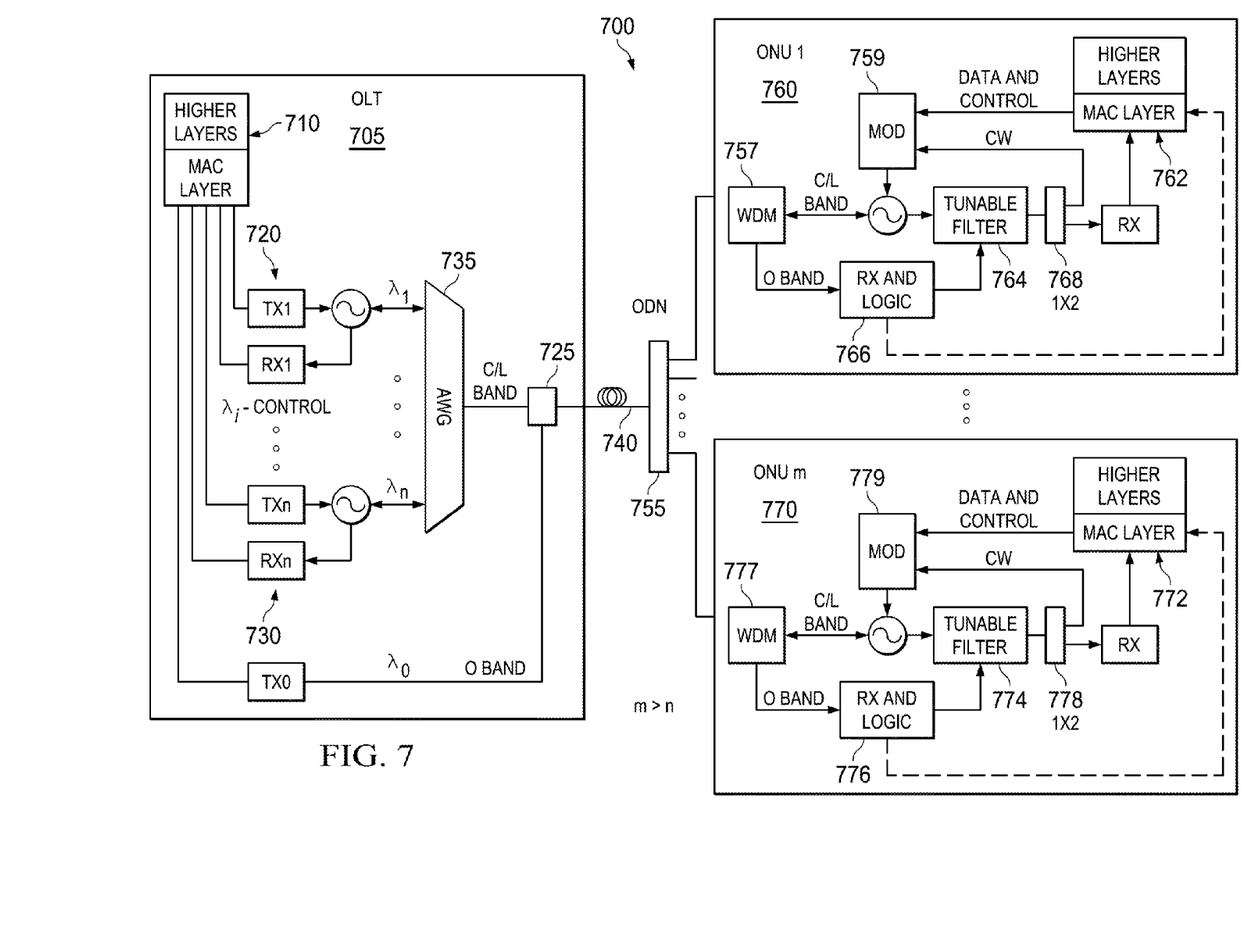
FIG. 7 is a system block diagram of an example embodiment of the OLT and ONU of the WDM PON of FIG. 2 with an out of band control channel.

An example embodiment of WDM PON architecture with dual-band controls with the ONU of FIG. 5 is provided in FIG. 7. OLT 705 uses fixed wavelength dense wavelength division multiplexing (DWDM) grade distributed feedback (DFB) laser transmitters as an example light source. The flexibility of the architecture is realized by employing tunable optical filters at ONUs 760 . . . 770. Power splitter based WDM PON may employ optical filter 755 at ONUs 760 . . . 770 in an example embodiment.

WDM PON 700 includes fixed wavelength optical transmitters 720 . . . 730 in Optical Line Termination (OLT) 705 with tunable receiver colorless Optical Network Units (ONUs) 760 . . . 770 that reuse the downstream light to carry upstream data. The same wavelength may be used for downstream and upstream transmissions on single fiber 740. In this architecture, the number of ONUs 760 . . . 770 may be greater than the number of transmitters 720 . . . 730 at OLT 705. An example embodiment of the disclosed system uses Arrayed Waveguide Grating (AWG) 735 or WDM filters at OLT 705 and passive optical splitter 755 in the field. In an example embodiment, wavelength router (AWG or thin film filters) 735 is used at the Central Office to route both downstream and upstream wavelengths. There is no change to power splitter-based ODN that currently use GPON/EPON.

In an example embodiment, wavelength router 735 is positioned at the head-end so that AWG (as an example) 735 is in OLT 705. Since the transmitter is fixed, each of the transmitter and receiver pairs 720 . . . 730 corresponds to one channel. Transmitter/receiver pair 720 comprises a transmitter and a receiver for channel 1. Pair 730 comprises a transmitter and receiver pair for channel N. Each transmitter is configured to transmit on a fixed wavelength. The transmitter of pair 720 transmits on a $\lambda_1$ wavelength and is coupled to AWG 735 where it is combined with signals on the wavelengths of each of the other transmitters. The combined signal is transmitted along fiber 740 to power splitter 755. Power splitter 755 passes the several distinguished wavelengths to each ONU 760 . . . 770 so each ONU receives all the wavelengths transmitted on fiber 740. Each ONU 760 . . . 770 may include a filter to filter out all wavelengths but the wavelength intended for the particular ONU.

In an example embodiment, the upstream and downstream of each ONU share the same wavelength, transmitting in TDD mode to avoid wavelength contingency. The downstream and upstream transmission cycle may be dynamically changed to fully utilize the bandwidth according to the upstream and downstream traffic dynamics.

In an example embodiment, fixed wavelengths transmitters are used at OLT 705. There may be n fixed wavelength transmitters at OLT 705 that serve m ONUs, where m is greater than or equal to n. Allowing the numbers of ONUs to exceed the transmitters in OLT 705 offers scalability to the system. In such an embodiment, adding an ONU does not require changing of OLT hardware.

Example embodiments of ONUs 760, 770 employ a dedicated O band control channel. In ONU 760, 770, the O band control wavelength is separated from the C band and/or L band by WDM filter 757, 777. O band receiver 766, 776 constantly receives the control signal while OLT 705 instructs ONU 760, 770 to tune to a wavelength in C band and/or L band for receiving downstream data. After receiving the downstream data, ONU 760, 770 may use the CW light to transmit upstream data back to OLT 705. An optical circulator (between WDM 757, 777 and tunable filter 764, 774) may be used to separate and combine modulated downstream and upstream signals. In an example embodiment, OLT 705 may also send control signals periodically via a part-time control wavelength to all ONUs in case of problems with the O band control channel. In an example embodiment, ONU 760, 770 tunes to wavelength $\lambda_0$ of the O band control channel by default on initial boot up.

WDM filter 757, 777 separates the O band control channel from the rest of the C band and/or L band channels. O band receiver 766, 776 decodes the control signal. One part of the decoded control signal is used to control tunable filter 764, 774 for selecting the wavelength assigned to ONU 760 . . . 770 by the OLT. The rest of the decoded control signal is sent to MAC layer 762, 772 to control the upstream transmission cycle. The downstream light containing multiple wavelength channels from WDM filter 757, 777 is sent to the optical circulator and is passed to tunable filter 764, 774 which selects the assigned wavelength.

The selected wavelength channel that contains CW light and modulated data signal is separated into two pieces by 1×2 splitter 768, 778. A first piece with the modulated data signal is sent to an optical receiver for decoding downstream user date. The CW light is filtered out. The decoded user data is sent to MAC and higher layers 762, 772 for further processing. The second piece with CW light is sent to modulator 759, 779 for modulating upstream data. The original modulated downstream data is filtered out at the upstream receiver at OLT. The modulated optical signal is sent to the upstream via the optical circulator.

OLT 705 also sends CW light periodically via O band control wavelength $\lambda_0$ to all ONUs. In case that an ONU does not receive downstream data but has upstream data to send, it may send the wavelength setup request by remodulating the CW light received from the O band control channel. Since most of the control command from OLT 705 are sent to ONUs through an O band control channel, the C band and/or L band part-time control channel may be used to carry user data as well. The downstream and upstream transmission asymmetry may be dynamically negotiated between OLT 705 and ONU 760, 770. Once ONU 760, 770 has been assigned a wavelength, in-band control may also be established as the part of the protocol.

Figure 8:
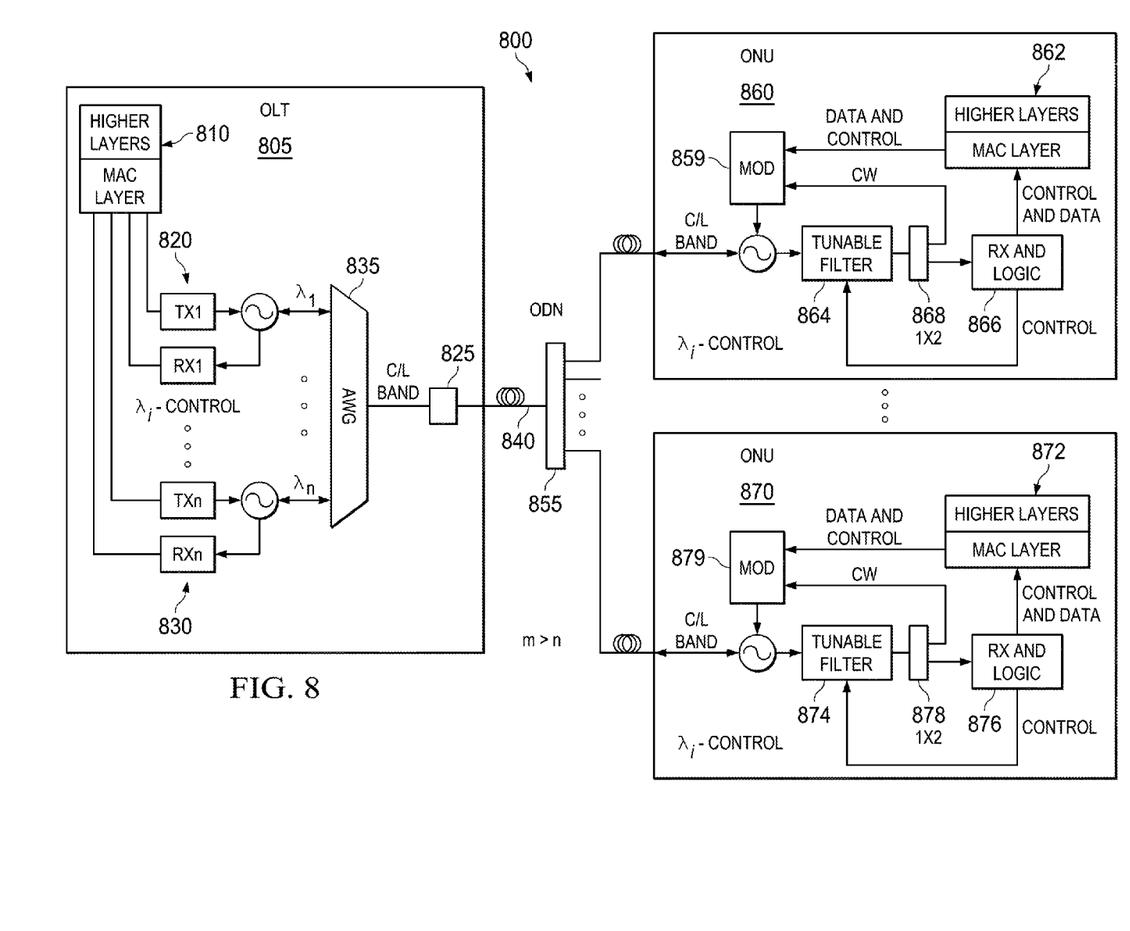
FIG. 8 is a system block diagram of an example embodiment of the OLT and ONU of the WDM PON of FIG. 2 with an in-band C band and/or L band control channel.

FIG. 8 provides an example embodiment of WDM architecture with signal control channel provided in FIG. 6. In this example embodiment, the O band control channel has been removed to simplify the design. Therefore, the C band and/or L band control channel becomes full-time, i.e., it will be dedicated for control only. OLT 805 uses fixed wavelength dense wavelength division multiplexing (DWDM) grade distributed feedback (DFB) laser transmitters as an example light source. The flexibility of the architecture is realized by employing tunable optical filters at ONUs 860 . . . 870. Power splitter based WDM PON may employ optical filter 864, 874 at ONUs 860 . . . 870 in an example embodiment.

WDM PON 800 includes fixed wavelength optical transmitters 820 . . . 830 in Optical Line Termination (OLT) 805 with tunable receiver colorless Optical Network Units (ONUs) 860 . . . 870 that reuse the downstream light to carry upstream data. The same wavelength may be used for downstream and upstream transmissions on single fiber 840. In this architecture, the number of ONUs 860 . . . 870 may be greater than the number of transmitters 820 . . . 830 at OLT 805. An example embodiment of the disclosed system uses Arrayed Waveguide Grating (AWG) 835 or WDM filters at OLT 805 and passive optical splitter 855 in the field. In an example embodiment, wavelength router (AWG or thin film filters) 835 is used at the Central Office to route both downstream and upstream wavelengths. There is no change to GPON/EPON power splitter-based ODN.

In an example embodiment, wavelength router 835 is positioned at the head end so that AWG (as an example) 835 is in OLT 805. Since the transmitter is fixed, each of the transmitter and receiver pairs 820 . . . 830 corresponds to one channel. Transmitter/receiver pair 820 comprises a transmitter and a receiver for channel 1. Pair 830 comprises a transmitter and receiver pair for channel N. Each transmitter is configured to transmit on a fixed wavelength. The transmitter of pair 820 transmits on a $\lambda_1$ wavelength and is coupled to AWG 835 where it is combined with signals on the wavelengths of each of the other transmitters. The combined signal is transmitted along fiber 840 to power splitter 855. Power splitter 855 passes the several distinguished wavelengths to each ONU 860 . . . 870 so each ONU receives all the wavelengths transmitted on fiber 840. Each ONU 860 . . . 870 may include a filter to filter out all wavelengths but the wavelength intended for the particular ONU.

In an example embodiment, the upstream and downstream of each ONU share the same wavelength, transmitting in TDD mode to avoid wavelength contingency. The downstream and upstream transmission cycle may be dynamically changed to fully utilize the bandwidth according to the upstream and downstream traffic dynamics.

In an example embodiment, fixed wavelengths transmitters are used at OLT 805. There may be n fixed wavelength transmitters at OLT 805 that serve m ONUs, where m is greater than or equal to n. Allowing the numbers of ONUs to exceed the transmitters in OLT 805 offers scalability to the system. In such an embodiment, adding an ONU does not require changing of OLT hardware.

In example embodiment of ONU 860, 870, a C band and/or L band wavelength $\lambda_i$ may be used as a full-time control channel. When ONU 860, 870 initially performs a boot up sequence, ONU 860, 870 tunes to wavelength λi by default. Using this control channel, OLT 805 instructs ONU 860, 870 to tune to a wavelength in C band and/or L band for receiving downstream data. After receiving the downstream data, ONU 860, 870 may use the CW light to transmit upstream data back to OLT 805. An optical circulator (before tunable filter 864, 874) is used to separate and combine modulated downstream and upstream lights. Once ONU 860, 870 has been assigned a wavelength, in-band control may also be established as the part of the protocol.

The incoming downstream light is passed by an optical circulator to tunable optical filter 864, 874. The predefined control wavelength channel $\lambda_i$ is decoded. The decoded control signal is used to control tunable filter 864, 874 for selecting the wavelength assigned to ONU 860 . . . 870 by the OLT. The selected wavelength channel that contains CW light and modulated data signal is separated into two pieces by 1×2 splitter 868, 878. The first piece with the modulated data signal is sent to optical receiver 866, 876 for decoding downstream user data. The CW light is filtered out. The decoded user data is sent to MAC and higher layers 862, 872 for further processing. The second piece with CW light is sent to modulator 859, 879 for modulating upstream data. The original modulated downstream data is filtered out at the upstream receiver at the OLT. The modulated optical signal is sent upstream from modulator 859, 879 via the optical circulator.

OLT 805 also sends CW light periodically via control wavelength λi to all ONUs connected to the power splitter. In a case in which ONU 860, 870 does not receive downstream data but has upstream data to send, ONU 860, 870 may send a wavelength setup request by re-modulating the CW light received from the C band and/or L band control channel. The duplex asymmetry of downstream and upstream transmissions may be dynamically negotiated between the OLT and the ONU.

Figure 9:
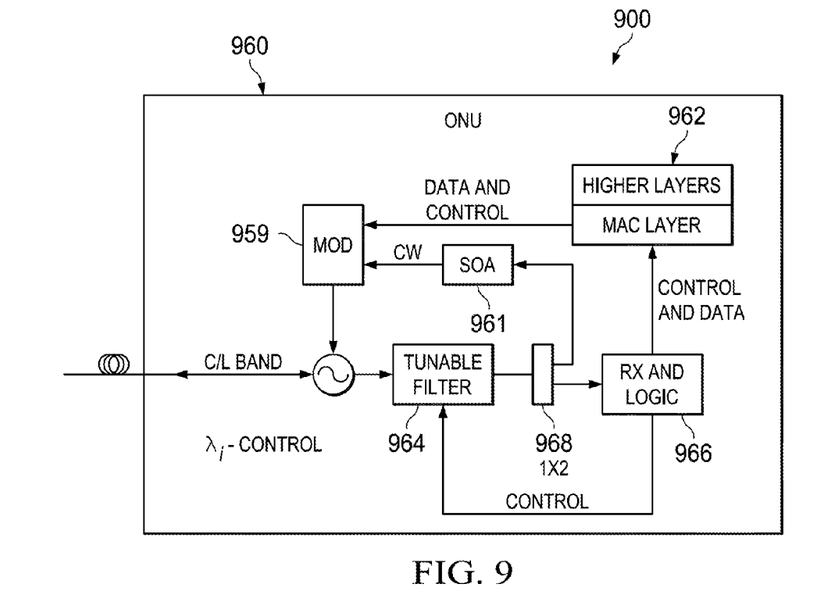
FIG. 9 is a system block diagram of an example embodiment of the ONU of FIG. 6 with an SOA.

In an example embodiment, high power lasers may be used at the OLT to eliminate the use of optical amplifiers at the ONUs. However, an SOA (Semiconductor Optical Amplifier) may be used at the ONU to boot up the optical signal before it is fed into the modulator. FIG. 9. provides the ONU design of FIG. 7 with SOA 961 between splitter 968 and modulator 959. In example embodiment 900 of ONU 960, a C band and/or L band wavelength A may be used as a full-time control channel. When ONU 960 initially performs a boot up sequence, ONU 960 tunes to wavelength λi by default. Using this control channel, the OLT instructs ONU 960 to tune to a wavelength in C band and/or L band for receiving downstream data. After receiving the downstream data, ONU 960 can use the CW light to transmit upstream data back to OLT. An optical circulator (before tunable filter 964) is used to separate and combine modulated downstream and upstream lights. Once ONU 960 has been assigned a wavelength, in-band control may also be established as the part of the protocol.

The incoming downstream light is passed by an optical circulator to tunable optical filter 964. The predefined control wavelength channel A is decoded. The decoded control signal is used to control tunable filter 964 for selecting the wavelength assigned to ONU 960 by the OLT. The selected wavelength channel that contains CW light and modulated data signal is separated into two pieces by 1×2 splitter 980. The first piece with the modulated data signal is sent to optical receiver 966 for decoding downstream user data. The CW light is filtered out. The decoded user data is sent to MAC and higher layers 962 for further processing. The second piece with CW light is sent to through SOA 961 for amplification to modulator 959 for modulating upstream data. The original modulated downstream data is filtered out at the upstream receiver at the OLT. The modulated optical signal is sent upstream from modulator 959 via the optical circulator.

The OLT also sends CW light periodically via control wavelength λi to all ONUs connected to the power splitter. In a case in which ONU 960 does not receive downstream data but has upstream data to send, ONU 960 may send a wavelength setup request by re-modulating the CW light received from the C band and/or L band control channel. The duplex asymmetry of downstream and upstream transmissions may be dynamically negotiated between the OLT and ONU 960.

Figure 10:
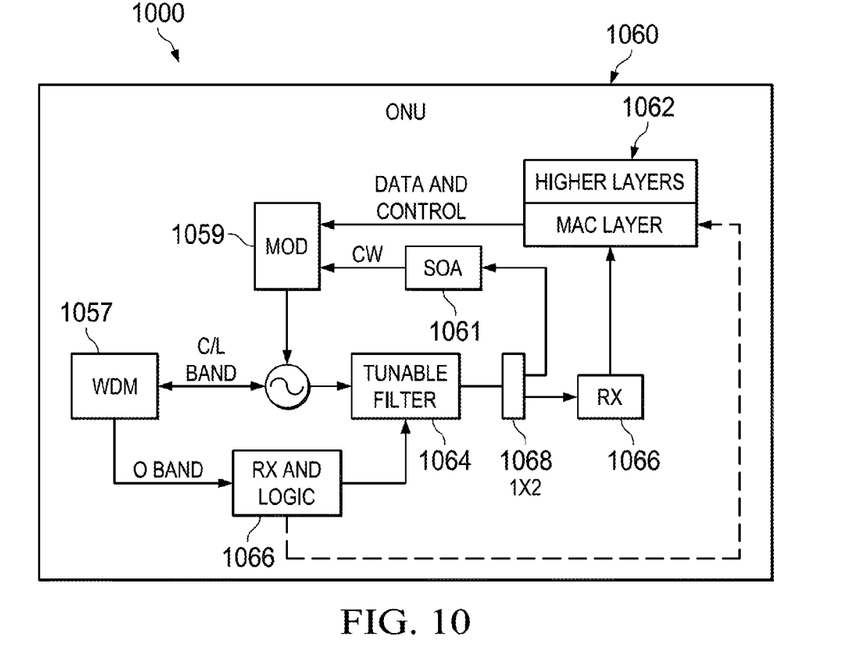
FIG. 10 is a system block diagram of an example embodiment of the ONU of FIG. 5 with an SOA.

FIG. 10 provides the ONU design of FIG. 6 with SOA 1061 between splitter 1068 and modulator 1059. FIG. 10 provides example embodiment 1000 of ONU 1060 with a dedicated O band control channel. In ONU 1060, the O band control wavelength is separated from the C band and/or L band by WDM filter 1057. O band receiver 1066 constantly receives the control signal while the OLT instructs ONU 1060 to tune to a wavelength in C band and/or L band for receiving downstream data. After receiving the downstream data, ONU 1060 may use the CW light to transmit upstream data back to the OLT. An optical circulator (between WDM 1057 and tunable filter 1064) may be used to separate and combine modulated downstream and upstream signals. WDM filter 1057 separates the O band control channel from the rest of the C band and/or L band channels. In an example embodiment, the OLT may also send control signals periodically via a part-time control wavelength to all ONUs in case of problems with the O band control channel. In an example embodiment, ONU 1060 tunes to the wavelength $\lambda_O$ of the O band control channel by default on initial boot up.

WDM filter 1057 separates the O band control channel from the rest of the C band and/or L band channels. O band receiver 1066 decodes the control signal. One part of the decoded control signal is used to control tunable filter 1064 for selecting the wavelength assigned to ONU 1060 by the OLT. The rest of the decoded control signal is sent to MAC layer 1062 to control the upstream transmission cycle. The downstream light containing multiple wavelength channels from WDM filter 1057 is sent to the optical circulator and is passed to tunable filter 1064 which selects the assigned wavelength.

The selected wavelength channel that contains CW light and modulated optical signal is separated into two pieces by 1×2 splitter 1068. A first piece with the modulated data signal is sent to optical receiver 1066 for decoding downstream user date. The CW light is filtered out. The decoded user data is sent to MAC and higher layers 1062 for further processing. The second piece with CW light is sent through SOA 1061 for amplification and to modulator 1059 for modulating upstream data. The original modulated downstream data is filtered out at the upstream receiver at OLT. The modulated optical signal is sent to the upstream via the optical circulator.

The OLT also sends CW light periodically via O band control wavelength $\lambda_o$ to all ONUs. In case that an ONU does not receive downstream data but has upstream data to send, it may send the wavelength setup request by remodulating the CW light received from the O band control channel. Since most of the control command from the OLT are sent to ONUs through an O band control channel, the C band and/or L band part-time control channel may be used to carry user data as well. The downstream and upstream transmission asymmetry may be dynamically negotiated between the OLT and ONU 1060. Once ONU 1060 has been assigned a wavelength, in-band control may also be established as the part of the protocol.

Figure 11:
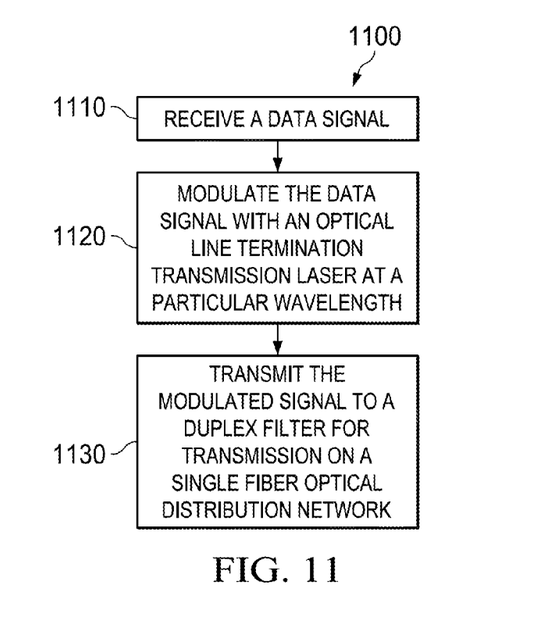
FIG. 11 is a flow diagram of an example embodiment of a method of wavelength division multiplexing passive optical networking.

FIG. 11 provides flow chart 1100 of an example embodiment of a method of wavelength division multiplex passive optical networking. In block 1110, a data signal is received. In block 1120, the data signal is modulated with an optical line termination transmission laser at a particular wavelength. In block 1130, the modulated signal is transmitted to a duplex filter for transmission on a single fiber optical distribution network.

The flow chart of FIG. 11 shows the architecture, functionality, and operation of a possible implementation of the wavelength division multiplex passive optical networking software. In this regard, each block represents a module, segment, or portion of code, which comprises one or more executable instructions for implementing the specified logical function(s). It should also be noted that in some alternative implementations, the functions noted in the blocks may occur out of the order noted in FIG. 11. For example, two blocks shown in succession in FIG. 11 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

The logic of the example embodiment(s) can be implemented in hardware, software, firmware, or a combination thereof. In example embodiments, the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of the example embodiments disclosed herein in logic embodied in hardware or software-configured mediums.

Software embodiments, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, or communicate the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical). In addition, the scope of the present disclosure includes embodying the functionality of the example embodiments of the present disclosure in logic embodied in hardware or software-configured mediums.

Although the present invention has been described in detail, it should be understood that various changes, substitutions and alterations can be made thereto without departing from the spirit and scope of the invention as defined by the appended claims.

Therefore, at least the following is claimed:

1. A system comprising:
    an optical line termination (OLT) transmitter laser of a plurality of OLT transmitter lasers configured to transmit at a particular wavelength, the OLT transmitter laser further configured to transmit a control channel on the O band (1260 nm-1360 nm) and a part-time control channel in the C band (1530 nm-1565 nm) and/or the L band (1565 nm-1625 nm); and
    a wavelength router configured to couple a downstream optical signal from the OLT transmitter laser onto a single fiber optical distribution network for reception by a passive optical power splitter, the wavelength router further configured to receive an upstream optical signal from the single fiber optical distribution network and route the upstream data signal to an appropriate receiver.

2. The system of claim 1, wherein the wavelength router is at least one of an arrayed waveguide grating (AWG) and a thin film filter.

3. The system of claim 1, wherein the OLT transmitter laser transmits continuous wave light with an on-off keying modulated optical signal.

4. The system of claim 1, wherein the O band control channel is coupled to an output of the wavelength router with a wavelength division multiplexing multiplier.

5. The system of claim 1, wherein the OLT transmitter laser is further configured to transmit a full-time control channel in the C band (1530 nm-1565 nm) and/or the L band (1565 nm-1625 nm).

6. The system of claim 1, wherein the OLT transmitter laser is coupled to the wavelength router with an optical circulator.

7. The system of claim 1, further comprising an optical network unit configured to receive an optical signal on the particular wavelength from a passive optical power splitter and send an upstream optical signal on the same wavelength.

8. The system of claim 7, wherein the upstream signal and downstream signal are transmitted in time division duplex mode.

9. A method comprising
receiving a data signal;
modulating the data signal with an optical line termination transmitter laser at a particular wavelength;
transmitting the modulated signal to a wavelength router for transmission on a single fiber optical distribution network;
transmitting a control channel on the O band (1260 nm-1360 nm); and
transmitting a part-time control channel in the C band (1530 nm-1565 nm) and/or the L band (1565 nm-1625 nm).

10. The method of claim 9, further comprising modulating the light using on-off keying.

11. The method of claim 9, further comprising transmitting the light in a continuous wave.

12. The method of claim 9, further comprising coupling the O band control channel to an output of the wavelength router with a wavelength division multiplexing multiplier.

13. The method of claim 9, further comprising transmitting a full-time control channel in the C band (1530 nm-1565 nm) and/or the L band (1565 nm-1625 nm).

14. A system comprising:
an optical line termination (OLT) transmitter laser of a plurality of OLT transmitter lasers configured to transmit at a particular wavelength, the OLT transmitter laser further configured to transmit a control channel on the O band (1260 nm-1360 nm) and a part-time control channel in the C band (1530 nm-1565 nm) and/or the L band (1565 nm-1625 nm);
a wavelength router configured to couple a downstream optical signal from the OLT transmitter laser onto a single fiber optical distribution network for reception by a passive optical power splitter, the wavelength router further configured to receive an upstream optical signal from the single fiber optical distribution network and route the upstream optical signal to an appropriate receiver;
a plurality of optical network units (ONUs) configured to receive downstream optical signals and transmit upstream optical signals; and
a passive optical power splitter configured to route the downstream optical signal to a particular ONU of the plurality of ONUs based on the received wavelength.

15. The system of claim 14, wherein the particular ONU is configured to send an upstream optical signal on the same wavelength on which it received the downstream optical signal.

16. The system of claim 15, wherein the upstream optical signal and downstream optical signal are transmitted in half duplex mode.

* * * * *